United States Patent
Castle

(10) Patent No.: US 8,386,108 B2
(45) Date of Patent: Feb. 26, 2013

(54) SYSTEM AND METHOD OF CONTROLLING SUPPLY VOLTAGE POLARITY ON A VEHICLE

(75) Inventor: Raymond Castle, White Oak, PA (US)

(73) Assignee: Bombardier Transportation GmbH, Berlin (DE)

( * ) Notice: Subject to any disclaimer, the term of this patent is extended or adjusted under 35 U.S.C. 154(b) by 96 days.

(21) Appl. No.: 13/038,888

(22) Filed: Mar. 2, 2011

(65) Prior Publication Data

US 2012/0226398 A1 Sep. 6, 2012

(51) Int. Cl.
- *B60L 9/00* (2006.01)
- *B60L 11/00* (2006.01)
- *G05D 1/00* (2006.01)
- *G05D 3/00* (2006.01)
- *G06F 7/00* (2006.01)
- *G06F 17/00* (2006.01)

(52) U.S. Cl. .......... 701/22; 701/19; 180/65.1; 191/22 R; 361/3

(58) Field of Classification Search .............. 701/19, 701/20, 22; 180/205.1, 279, 65.1, 65.31, 180/65.8; 318/139, 148; 191/1 A, 22 R, 191/23 R; 361/3, 19, 42, 54, 108, 637
See application file for complete search history.

(56) References Cited

U.S. PATENT DOCUMENTS

| | | | |
|---|---|---|---|
| 4,220,924 A | 9/1980 | Osann, Jr. | |
| 4,372,273 A | 2/1983 | Harper | |
| 4,714,976 A | 12/1987 | Pin et al. | |
| 6,246,928 B1 | 6/2001 | Louis et al. | |
| 6,934,603 B1 * | 8/2005 | Kochanneck | 700/245 |
| 7,460,344 B2 | 12/2008 | Hastings et al. | |
| 8,242,752 B2 * | 8/2012 | Minkkinen | 320/165 |

FOREIGN PATENT DOCUMENTS

| | | | |
|---|---|---|---|
| DE | 29921062 U1 | 3/2000 | |
| EP | 0149877 A1 | 7/1985 | |
| EP | 1808326 A1 | 7/2007 | |
| WO | WO93/15929 A1 | 8/1993 | |

* cited by examiner

*Primary Examiner* — Hussein Elchanti
*Assistant Examiner* — Rami Khatib
(74) *Attorney, Agent, or Firm* — The Webb Law Firm

(57) ABSTRACT

In a system and method of supplying proper polarity electrical power to positive and negative conductors of a vehicle, first and second pairs of vehicle mounted contacts are electrically connected between positive and negative conductors of a first electrical bus and the positive and negative conductors of the vehicle, respectively. In response to the first pair of contacts moving into a space or gap between the first electrical bus and a second electrical bus, the first pair of contacts is isolated from the positive and negative conductors of the vehicle. In response to the vehicle moving the first pair of contacts into contact with the second electrical bus while the second pair of contacts are electrically connected to the first electrical bus, the first pair of contacts is electrically connected between the negative and positive conductors of the vehicle and negative and positive conductors of the second electrical bus, respectively.

22 Claims, 9 Drawing Sheets

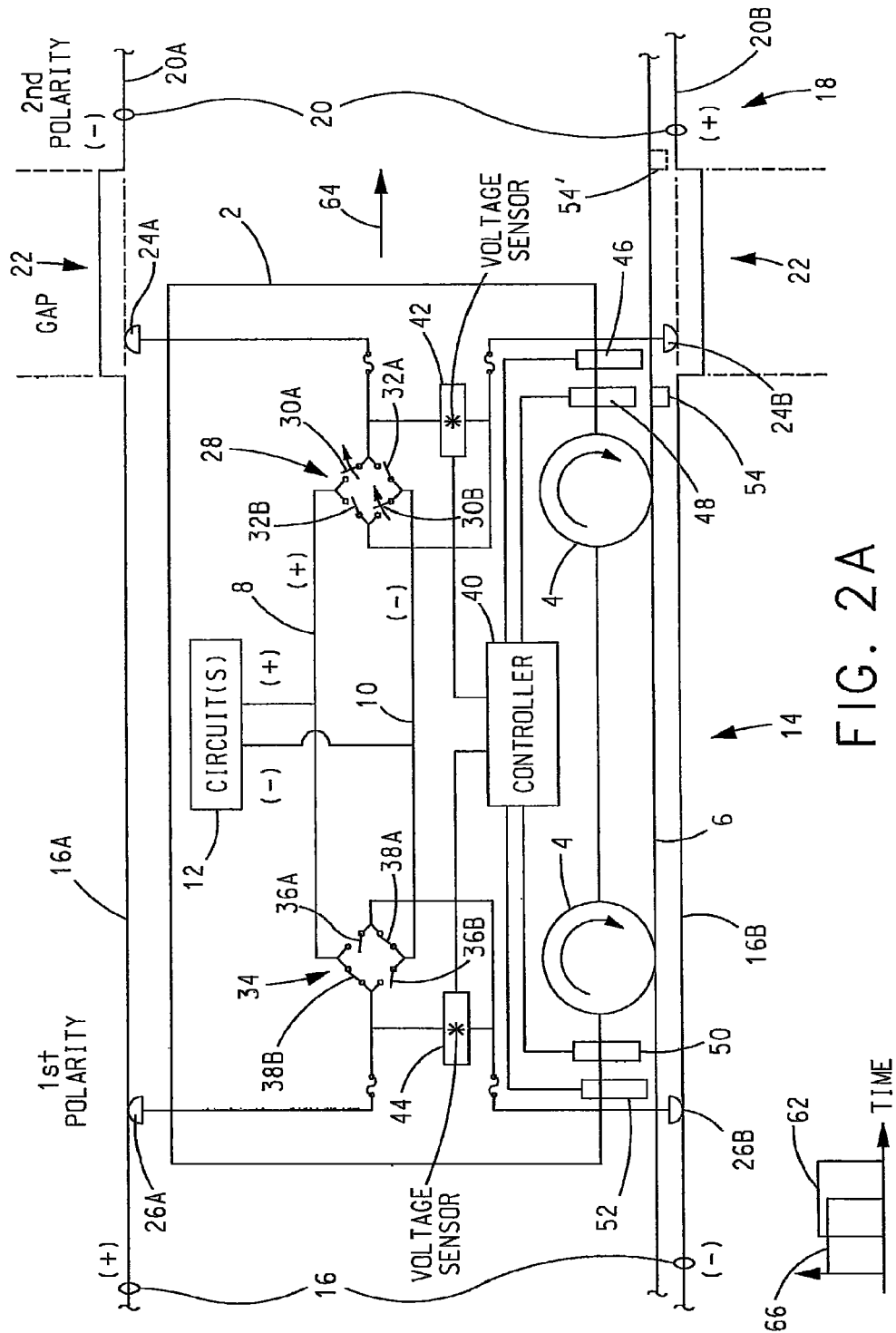

SYSTEM AND METHOD OF CONTROLLING SUPPLY VOLTAGE POLARITY ON A VEHICLE

BACKGROUND OF THE INVENTION

1. Field of the Invention

The present invention relates to the controlled delivery of electrical power of proper polarity to one or more circuits of a vehicle that receives electrical power from two or more electrical bus lines of different polarity positioned along the pathway on which the vehicle travels to operate one or more circuits of the vehicle.

2. Description of Related Art

Vehicles, such as without limitation, a train, a people mover, and the like, which travel along a pathway and which receive electrical power from two or more electrical buses of opposite polarity positioned along said pathway for the operation of one or more circuits of the vehicle are well known in the art. Such pathways can be of any suitable and/or desirable form that facilitates the movement of rail and/or non-rail vehicles therealong, including, without limitation, a rail vehicle or tire-mounted vehicle (e.g., a people mover).

Heretofore, to avoid creating a short circuit between an electrical bus of one polarity and an electrical bus of another polarity when one pair of contacts of the vehicle moves from being in contact with the bus of the first polarity to the bus of the second polarity while a second pair of contacts of the vehicle are in contact with the electrical bus of the first polarity, switches or contactors within the vehicle were operated to electrically isolate the one or more circuits of the vehicle from the electrical buses until both pairs of contacts were in contact with an electrical bus of the same polarity.

A problem with isolating one or more circuits of the vehicle from a source of electrical power until both sets of vehicle contacts have completed moving from being in contact from the electrical bus of a first polarity to the electrical bus of a second polarity is that passengers are subjected to discomforting ride-quality concerns such as: loss of interior lights; a sudden change in air/heat circulation and associated sound; a sudden change to ride quality (a momentary jerk in motion), and the like. Examples of vehicle circuits that receive power from such electrical buses include interior lights; heating and air conditioning system; an electric motor of the vehicle utilized to drive the vehicle along the pathway, and the like.

Accordingly, it would be desirable to provide a system and method that enables circuits of the vehicle traveling along a pathway to receive a constant supply of proper polarity electrical power from two or more electrical buses of opposite polarity disposed along said pathway.

SUMMARY OF THE INVENTION

In a vehicle having positive and negative conductors for supplying electrical power to one or more electrical circuits of the vehicle as the vehicle moves along a path from a first section of the path that has a first electrical bus of a first electrical polarity to a second section of the path that has a second electrical bus of a second, opposite electrical polarity, wherein the first and second electrical buses are spaced from each other (e.g., by a gap), the invention is a method of supplying electrical power of proper polarity to the positive and negative conductors of the vehicle. The method includes: (a) electrically connecting first and second pairs of vehicle mounted contacts between the first electrical bus and the positive and negative conductors of the vehicle, each pair of contacts including first and second contacts electrically connected between positive and negative conductors of the first electrical bus and the positive and negative conductors of the vehicle, respectively; (b) following step (a), in response to the vehicle moving the first pair of contacts into the space between the first and second electrical buses while the second pair of contacts are electrically connected between the first electrical bus and the positive and negative conductors of the vehicle, electrically isolating the first pair of contacts from the positive and negative conductors of the vehicle; and (c) following step (b), in response to the vehicle moving the first pair of contacts into contact with the second electrical bus while the second pair of contacts are electrically connected between the first electrical bus and the positive and negative conductors of the vehicle, electrically connecting the first and second contacts of the first pair of contacts between the negative and positive conductors of the vehicle and negative and positive conductors of the second electrical bus, respectively.

The method can further include: (d) following step (c), in response to the vehicle moving the second pair of contacts into the space between the first and second electrical buses while the first pair of contacts are electrically connected between the second electrical bus and the positive and negative conductors of the vehicle, electrically isolating the second pair of contacts from the positive and negative conductors of the vehicle; and (e) following step (d), in response to the vehicle moving the second pair of contacts into contact with the second electrical bus while the first pair of contacts are electrically connected between the second electrical bus and the positive and negative conductors of the vehicle, electrically connecting the first and second contacts of the second pair of contacts between the negative and positive conductors of the vehicle and negative and positive conductors of the second electrical bus, respectively.

The method can further include, for each pair of contacts, automatically connecting the first and second contacts of said pair of contacts to either the positive and negative conductors of the vehicle or the negative and positive conductors of the vehicle based on a polarity of a voltage between said pair of contacts in contact with the first or second electrical bus.

The method can further include, for each pair of contacts, automatically isolating said pair of contacts in the space between the first and second electrical buses from the positive and negative conductors of the vehicle based on an absence of current flowing through at least one of said contacts.

Step (b) can include electrically isolating the first pair of contacts from the positive and negative conductors of the vehicle in response to determining that the first pair of contacts have moved from electrical contact with the first electrical bus into the space between the first and second electrical buses.

Determining that the first pair of contacts have moved from electrical contact with the first electrical bus into the space between the first and second electrical buses can be based on movement of the vehicle relative to the space between the first and second electrical buses.

Step (d) can include determining when the second pair of contacts is about to move from electrical contact with the first electrical bus into the space between the first and second electrical buses, and delaying electrically isolating the second pair of contacts from the positive and negative conductors of the vehicle until the vehicle has moved the second pair of contacts into the space between the first and second electrical buses.

Determining when the second pair of contacts is about to move from electrical contact with the first electrical bus into the space between the first and second electrical buses can be based on movement of the vehicle relative to the space between the first and second electrical buses.

In a vehicle having positive and negative conductors for supplying electrical power to one or more electrical circuits of the vehicle, the invention is also a system for supplying desired polarity electrical power to the positive and negative conductors of the vehicle as the vehicle moves along a path from a first section of the path that has a first electrical bus of a first electrical polarity to a second section of the path that has a second electrical bus of a second, opposite electrical polarity, wherein the first and second electrical buses are spaced from each other, the system comprising: a first polarity switching bridge having input nodes coupled to a first pair of contacts and output nodes connected to the positive and negative conductors of the vehicle; a second polarity switching bridge having input nodes coupled to a second pair of contacts and output nodes connected to the positive and negative conductors of the vehicle, wherein each polarity switching bridge includes a plurality of switches or contactors connected in a bridge configuration; means for detecting when each of pair of contacts are in the space between the first and second electrical buses or moving into the space between the first and second electrical buses; and a controller responsive to the means for detecting for controlling the switches or contactors of each polarity switching bridge in coordination with the movement of the vehicle along the path such that, for each pair of contacts, the switches or contactors of the corresponding polarity switching bridge are set to first, second, and third states when said pair of contacts are in contact with the first electrical bus, in the space between the first and second buses, and in contact with the second electrical bus, respectively, wherein: the first, second, and third states of the switches or contactors are different; the first and third states of the switches or contactors couple the positive and negative conductors of the vehicle to positive and negative conductors of the first and second electrical buses that have opposite polarities via said pair of contacts; and the second state of the switches or contactors isolate the positive and negative conductors of the vehicle from said pair of contacts.

The first pair of contacts and the second pair of contacts are desirably spaced from each other on the vehicle a distance that is greater than the space between the first and second electrical buses, whereupon the first pair of contacts can be in contact with the second electrical bus while the second pair of contacts are in contact with the first electrical bus.

The means for detecting can include at least one of the following: a current sensor for detecting a flow of current through at least one contact, and a flag sensor for detecting the presence of a flag on the path.

In a vehicle having positive and negative conductors for supplying electrical power to one or more electrical circuits of the vehicle as the vehicle moves along a path from a first section of the path that has a first electrical bus of a first electrical polarity to a second section of the path that has a second electrical bus of a second, opposite electrical polarity, wherein the first and second electrical buses are separated from each other by a space, the invention is also a method of supplying electrical power of proper polarity to the positive and negative conductors of the vehicle. The method includes: (a) coupling the positive and negative conductors of the vehicle to positive and negative conductors of the first electrical bus having the first polarity via first and second pairs of contacts; (b) following step (a), in response to the first pair of contacts moving into the space between the first and second electrical buses when the positive and negative conductors of the vehicle are coupled to the positive and negative conductors of the first electrical bus via the second pair of contacts, isolating the first pair of contacts from the positive and negative conductors of the vehicle; and (c) following step (b), in response to the first pair of contacts moving into contact with positive and negative conductors of the second electrical bus having the second polarity opposite the first polarity while the positive and negative conductors of the vehicle remain coupled to the positive and negative conductors of the first bus via the second pair of contacts, coupling the positive and negative conductors of the vehicle to the positive and negative conductors of the second electrical bus via the first pair of contacts.

The method can further include, (d) following step (c), in response to the second pair of contacts moving into the space between the first and second electrical buses when the positive and negative conductors of the vehicle are coupled to the positive and negative conductors of the second electrical bus via the first pair of contacts, isolating the second pair of contacts from the positive and negative conductors of the vehicle; and (e) following step (d), in response to the second pair of contacts moving into contact with the positive and negative conductors of the second electrical bus when the positive and negative conductors of the vehicle are coupled to the positive and negative conductors of the second bus via the first pair of contacts, coupling the positive and negative conductors of the vehicle to the positive and negative conductors of the second electrical bus via the second pair of contacts.

The method can further include, determining the connection of each pair of contacts to the positive and negative conductors of the vehicle based on the polarity of the electrical bus in contact with said pair of contacts.

The method can further include, for each pair of contacts, isolating said pair of contacts in the space between the first and second electrical buses from the positive and negative conductors of the vehicle based on an absence of current flowing through at least one of said contacts.

Step (b) can include isolating the first pair of contacts from the positive and negative conductors of the vehicle in response to determining that the first pair of contacts have moved from electrical contact with the first electrical bus into the space between the first and second electrical buses.

Determining that the first pair of contacts have moved from electrical contact with the first electrical bus into the space between the first and second electrical buses can be based on detection of a flag positioned along the path by the space between the first and second electrical buses.

Step (d) can include determining when the second pair of contacts is about to move from electrical contact with the first electrical bus into the space between the first and second electrical buses, and delaying electrically isolating the second pair of contacts from the positive and negative conductors of the vehicle until the vehicle has moved the second pair of contacts into the space between the first and second electrical buses.

Determining when the second pair of contacts is about to move from electrical contact with the first electrical bus into the space between the first and second electrical buses can be based on detection of a flag positioned along the path by the space between the first and second electrical buses.

BRIEF DESCRIPTION OF THE DRAWINGS

FIG. 2A is a schematic view of the vehicle shown in FIG. 1A after further movement from left to right along the path whereupon the first pair of contacts of the vehicle are positioned in a space or gap between the first electrical bus and a second electrical bus;

FIG. 2B is a drawing of signals output by a first pair of flag sensors positioned adjacent the first pair of contacts in FIG. 2A;

DETAILED DESCRIPTION OF THE INVENTION

The present invention will be described with reference to the accompanying figures where like reference numbers correspond to like elements.

Figure 1A:
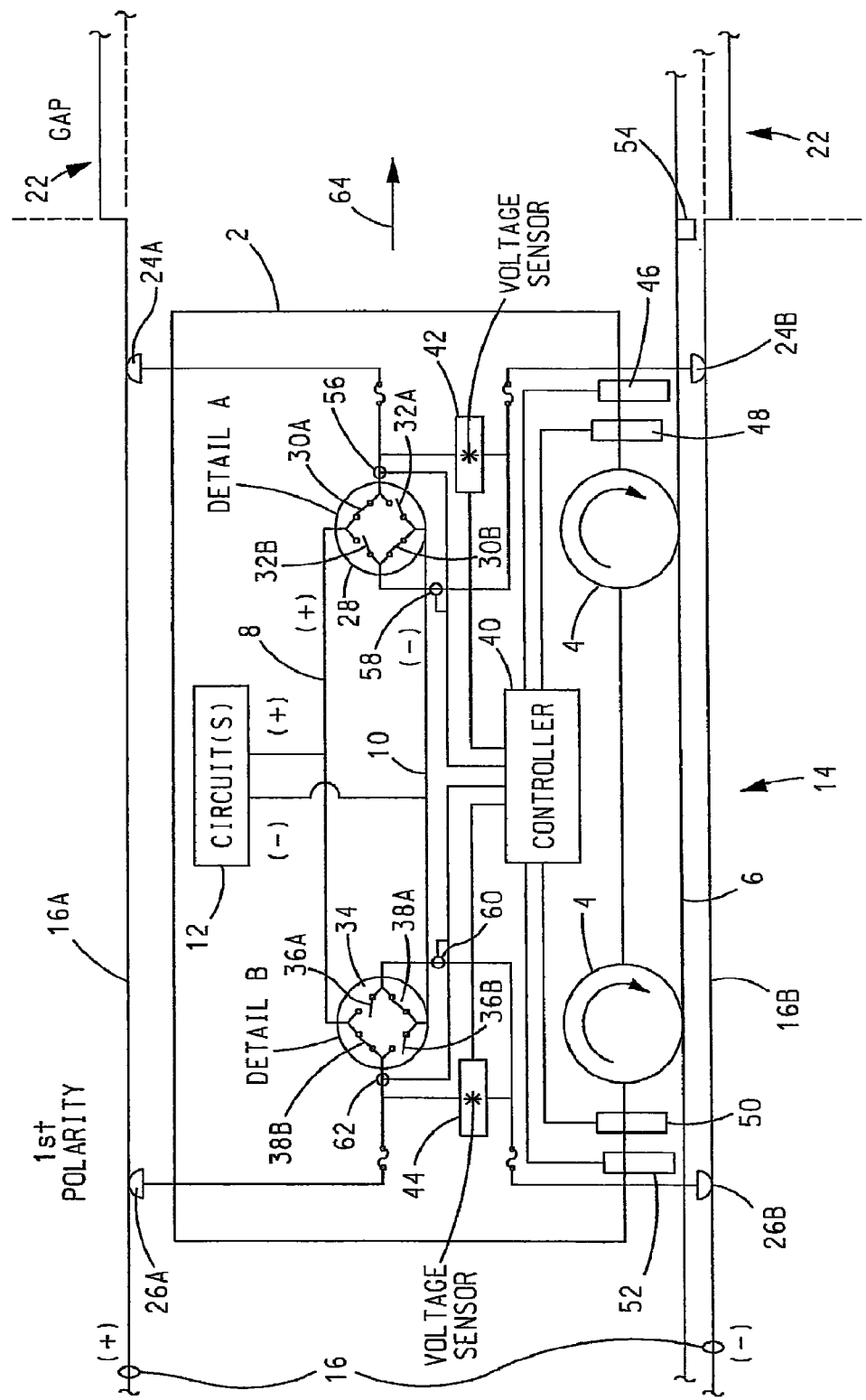
FIG. 1A is a schematic view of a vehicle, including first and second pairs of contacts, traveling from left to right along a path and receiving power from a first electrical bus that is positioned along the path.

With reference to FIG. 1A, a vehicle 2, such as an automated people mover, includes wheels 4 which are configured to travel along a path 6. Where path 6 is a smooth surface, wheels 4 can be tired wheels. In contrast, where path 6 includes rails, wheels 4 can be conventional rail wheels designed to travel on said rails. The description of wheels 4 and path 6 herein is not to be construed as limiting the invention since it is envisioned that vehicle 2 can be configured to travel along any type of pathway including, without limitation, a monorail, or along a pathway via magnetic levitation.

Vehicle 2 includes a positive conductor 8 and a negative conductor 10 for supplying electrical power to one or more electrical circuits 12 of vehicle 2 as vehicle 2 moves along path 6 from a first section 14 of path 6 that has a first electrical bus 16 of a first electrical polarity to a second section 18 of path 6 (FIG. 2A) that has a second electrical bus 20 of a second, opposite electrical polarity to the polarity of first electrical bus 16. First electrical bus 16 and second electrical bus 20 are separated from each other by a space or gap 22. As used herein, "space" or "gap" 22 can be either a physical opening or (as shown in phantom) an insulated or non-electrically conductive section of track that extends between first electrical bus 16 and second electrical bus 20.

Vehicle 2 includes a first pair of vehicle mounted contacts 24A and 24B adjacent one end of vehicle 2 and a second pair of vehicle mounted contacts 26A and 26B adjacent the other end of vehicle 2. When vehicle 2 is positioned in and/or moving through first section 14 of path 6, vehicle 2 moves contacts 24A and 24B in contact with a positive conductor 16A of first electrical bus 16 and a negative conductor 16B of first electrical bus 16. Similarly, vehicle 2 moves contacts 26A and 26B in contact with positive conductor 16A and negative conductor 16B, respectively, of first electrical bus 16 when vehicle 2 is positioned in and/or moving through first section 14 of path 6.

Figure 1B:
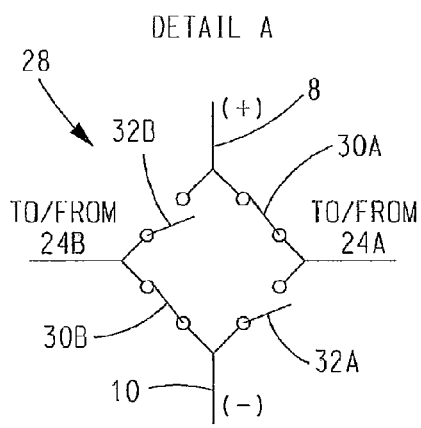
FIGS. 1B and 1C are enlarged schematic drawings of a first polarity-switching bridge of the vehicle shown in FIG. 1A.
Figure 1C:
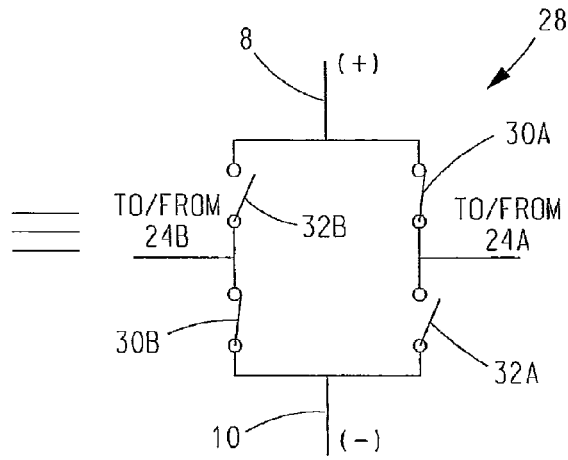

With reference to FIGS. 1B-1E and with continuing reference to FIG. 1A, a system for supplying desired polarity electrical power to the positive conductor 8 and the negative conductor 10 of vehicle 2 includes a first polarity switching bridge 28 connected between the first pair of contacts 24A and 24B and the positive conductor 8 and negative conductor 10 of vehicle 2. First bridge 28 includes four contacts or switches 30A, 30B, 32A, and 32B connected in the bridge configuration shown in FIG. 1B. An alternate rendering of switches 30A, 30B, 32A, and 32B in an H-bridge configuration is shown in FIG. 1C. Switches 30A and 30B can be part of a double-pole double-throw switch (or contactor) assembly since switches 30A and 30B will both be in their open or closed states at the same time. Similarly, switches 32A and 32B can be part of a double-pole double-throw switch (or contactor) assembly since switches 32A and 32B will both be in their open or closed states at the same time.

Figure 1D:
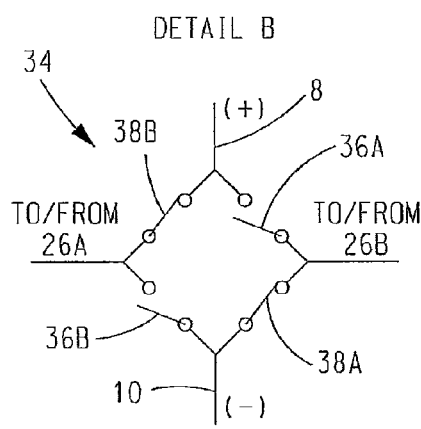
FIGS. 1D and 1E are enlarged schematic drawings of a second polarity-switching bridge shown in FIG. 1A.
Figure 1E:
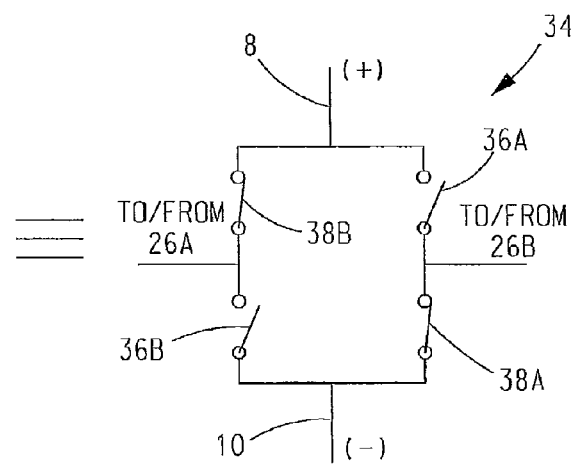

Vehicle 2 also includes a second polarity switching bridge 34 electrically connected between contacts 26A and 26B and positive conductor 8 and negative conductor 10. As shown in FIG. 1D, second bridge 34 includes contacts or switches 36A, 36B, 38A, and 38B. An alternate rendering of switches 36A, 36B, 38A, and 38B in an H-bridge configuration is shown in FIG. 1E. Switches 36A and 36B can be part of a double-pole double-throw switch (or contactor) assembly since switches 36A and 36B will both be in their open or closed states at the same time. Similarly, switches 38A and 38B can be part of a double-pole double-throw switch (or contactor) assembly since switches 38A and 38B will both be open in their open or closed states at the same time. The description herein of each pair of switches 30A-30B; 32A-32B; 36A-36B; and 38A-38B being in their open and closed states at the same time and/or being part of a double-pole double-throw switch assembly, however, is not to be construed as limiting the invention since it is envisioned that each switch can be controlled independent of the other switches and can be controlled to move between its open and closed states independent of each other switch.

The system also includes a controller 40, voltage sensors 42 and 44, flag sensors 46 and 48 positioned at the end of vehicle 2 that includes contacts 24A and 24B, and flag sensors 50 and 52 positioned adjacent the end of vehicle 2 that includes contacts 26A and 26B.

In the embodiment of vehicle 2 shown in the figures, contacts 24A and 26A are shown extending from the top of vehicle 2 while contacts 24B and 26B are shown extending from the bottom of vehicle 2. However, this is not to be construed as limiting the invention since it is envisioned that conductors 16A and 16B of first electrical bus 16 and conductors 20A and 20B of second electrical bus 20 can be positioned in any suitable and/or desirable position relative to vehicle 2. Hence, contacts 24A, 24B, 26A, and 26B can extend from any part of vehicle 2 and can be positioned to make appropriate contact with the conductors of first electrical bus 16 and second electrical bus 20 in any suitable and/or desirable manner.

In addition, while flag sensors 46-52 are shown positioned between contacts 24B and 26B in the figures, this is not to be construed as limiting the invention since it is envisioned that each flag sensor 46-52 can be positioned in any suitable and/or desirable location on vehicle 2 that facilitates control of the switches of first bridge 28 and/or second bridge 34 in the manner to be described hereinafter.

Voltage sensor 42 can be connected to detect the voltage at contact 24A, contact 24B, or both contacts 24A and 24B and can be configured to output an indication of the polarity of said sensed voltage(s) to controller 40. Similarly, voltage sensor 44 can be connected to detect the voltage at contact 26A, contact 26B, or both contacts 26A and 26B and can be configured to output an indication of the polarity of said sensed voltage(s) to controller 40.

Each flag sensor 46-52 is positioned on vehicle 2 in a manner to detect the presence of a wayside flag 54 disposed along path 6. Each flag sensor 46-52 is configured to co-act with wayside flag 54 such that when vehicle 2 moves said flag sensor past wayside flag 54, said flag sensor outputs a signal indicative of the passage of said flag sensor by wayside flag 54 to controller 40.

In the figures, wayside flag 54 is positioned in first section 14 of path 6 adjacent the left side of gap 22. However, this is not to be construed as limiting the invention since wayside flag 54 can be positioned at any suitable and/or desirable location along path 6, and one or more flag sensors 46-52 can be positioned on vehicle 2 at any suitable and/or desirable location on vehicle 2 that facilitates the operation of first and second bridges 28 and 34 in a manner to be described hereinafter.

Lastly, the system can include one or more optional current sensors 56, 58, 60, and/or 62, each of which is coupled to supply to controller 40 an indication of current flowing into or out of first bridge 28 and/or second bridge 34. Specifically, current sensor 56 can be disposed to detect current flowing between first bridge 28 and contact 24A and to provide an indication of said current flow to controller 40; current sensor 58 can be positioned to detect current flowing between first bridge 28 and contact 24B and to provide an indication of said current flow to controller 40; current sensor 60 can be positioned to sense current flow between second bridge 34 and contact 26B and to provide an indication of said current flow to controller 40; and current sensor 62 can be positioned to detect current flowing between second bridge 34 and contact 26A and to provide an indication of said current flow to controller 40. Each current sensor 56-62 can be of any suitable or desirable design, including, without limitation, a toroid or a Hall-effect sensor. However, this is not to be construed as limiting the invention since it is envisioned that any suitable and/or desirable current sensor that is capable of detecting current flow can be utilized. Current sensors 56-62 are only shown in FIGS. 1A, 7, and 8 for the purpose of simplicity.

Having described the elements comprising the system for supplying desired polarity electrical power to the positive conductor 8 and the negative conductor 10 of vehicle 2, the operation of said system will now be described.

With reference to FIGS. 1A-1E, when contacts 24A and 24B are in contact with or move into contact with conductors 16A and 16B, respectively, of first electrical bus 16 in response to vehicle 2 traveling on path 6 in direction 64, voltage sensor 42 senses the voltage impressed on contact 24A, contact 24B, or both contacts 24A and 24B by conductor(s) 16A and/or 16B and provides an indication of the polarity of the sensed voltage(s) to controller 40. In response to controller 40 determining via voltage sensor 42 that contact 24A is in contact with conductor 16A, which, in this example, acts as a source of positive electrical power, and/or that contact 24B is in contact with conductor 16B, which, in this example, acts as a source of negative electrical power, controller 40 controls the switches of first bridge 28 to assume states or remain in states where positive electrical power from conductor 16A is supplied to positive conductor 8, and negative electrical power is supplied from conductor 16B to negative conductor 10. More specifically, to facilitate positive conductor 8 and negative conductor 10 receiving electrical power from conductor 16A and conductor 16B, respectively, controller 40 controls switches 30A and 30B of first bridge 28 to be in their closed states and controls switches 32A and 32B of first bridge 28 to be in their open states as shown in FIGS. 1A-1C.

In a similar manner, when contacts 26A and 26B are in contact with or move into contact with conductor 16A and conductor 16B, voltage sensor 44 senses the voltage impressed on contact 26A, contact 26B, or both contacts 26A and 26B, and provides an indication of the polarity of said sensed voltage(s) to controller 40. In response to controller 40 determining via voltage sensor 44 that contact 26A is in contact with conductor 16A, which acts as a source of positive polarity electrical power, and/or that contact 26B is in contact with conductor 16B, which acts as a source of negative electrical power, controller 40 causes the switches of second bridge 34 to assume states or remain in states where positive electrical power from conductor 16A is supplied to positive conductor 8, and negative electrical power is supplied from conductor 16B to negative conductor 10. To facilitate positive conductor 8 and negative conductor 10 receiving electrical power from conductor 16A and conductor 16B, respectively, controller 40 controls switches 38A and 38B of second bridge 34 to be in their closed states and controls switches 36A and 36B of second bridge 34 to be in their open states as shown in FIGS. 1A, 1D, and 1E. In one non-limiting embodiment, conductor 16A has +375 Vdc impressed thereon and conductor 16B has −375 Vdc impressed thereon. However, this is not to be construed as limiting the invention.

With reference to FIGS. 2A and 2B and with continuing reference to FIG. 1A, in response to vehicle 2 traveling on path 6 in direction 64 to the position shown in FIG. 2A, contacts 24A and 24B move from being in contact with conductors 16A and 16B of first electrical bus 16 into gap 22 while contacts 26A and 26B remain in contact with conductors 16A and 16B respectively, of first electrical bus 16. In response to vehicle 2 traveling on path 6 in direction 64 whereupon flag sensor 46 passes wayside flag 54, flag sensor 46 outputs a signal 66 (FIG. 2B). Thereafter, in response to vehicle 2 traveling on path 6 in direction 64 whereupon flag sensor 48 passes wayside flag 54, flag sensor 48 outputs a signal 68 (FIG. 2B).

In response to controller 40 detecting signals 66 and 68 in that order, which order is indicative of contacts 24A and 24B being in gap 22, controller 40 causes switches 30A and 30B to move to their open states while maintaining switches 32A and 32B in their open states as shown in FIG. 2A. Opening switches 30A and 30B, while maintaining switches 32A and 32B in their open states, isolate positive conductor 8 and negative conductor 10 from contacts 24A and 24B and voltage sensor 42.

Figure 3:
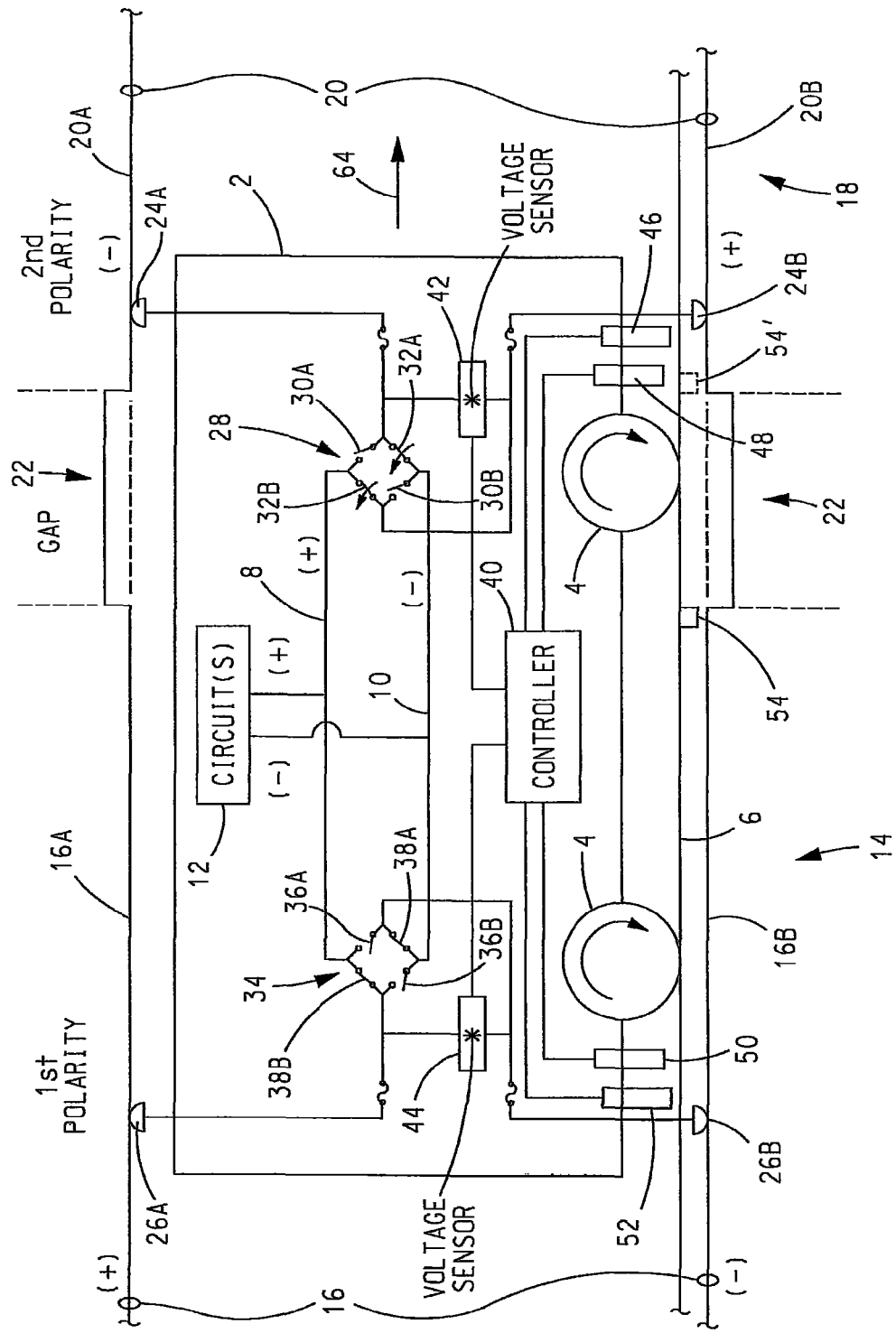
FIG. 3 is a schematic view of the vehicle shown in FIGS. 1A and 2A after further movement from left to right whereupon the first set of contacts are in contact with the second electrical bus and the second pair of contacts, positioned to the left of the space or gap, are in contact with the first electrical bus.

With reference to FIG. 3 and with continuing reference to all previous figures, in response to vehicle 2 traveling in direction 64 to the position shown in FIG. 3, contact 24A has moved into contact with conductor 20A of second electrical bus 20, which, in this example, acts as a source of negative power, and contact 24B has moved into contact with conductor 20B of second electrical bus 20, which, in this example, acts as a source of positive electrical power. It should be noted that the polarity of electrical power provided to the contacts 24A and 24B by conductors 16A and 16B of first electrical bus 16 is opposite to the polarity of the electrical power provided to contacts 24A and 24B by conductors 20A and 20B of second electrical bus 20. Thus, contact 24A experiences a reversal in polarity from a positive polarity when it is in contact with conductor 16A to a negative polarity when it is in contact with conductor 20A. Similarly, contact 24B experiences a reversal in polarity from a negative polarity when it is in contact with conductor 16B to a positive polarity when it is in contact with conductor 20B.

In response to contacts 24A and 24B moving into contact with conductors 20A and 20B, voltage sensor 42 senses the voltage impressed on contact 24A, contact 24B, or both contacts 24A and 24B, by conductor(s) 20A and/or 20B and provides an indication of the polarity of the sensed voltage(s) to controller 40. In response to receiving the indication of the polarity of conductors 20A and 20B in contact with contacts 24A and 24B, controller 40 controls the switches of first bridge 28 to connect positive conductor 8 to conductor 20B, acting as a source of positive electrical power, and to connect negative conductor 10 to conductor 20A, acting as a source of negative electrical power. More specifically, controller 40 causes switches 32A and 32B to move to their closed states while maintaining contacts 30A and 30B in their open states as shown in FIG. 3.

Because in FIG. 3 contacts 26A and 26B continue to be in contact with conductors 16A and 16B of first electrical bus 16 controller 40 does not change the states of the switches of second bridge 34 from the states shown and discussed above in connection with FIGS. 1A and 2A. Hence, when contacts 26A and 26B are in contact with conductors 16A and 16B of first electrical bus 16 having a first electrical polarity and contacts 24A and 24B are in contact with electrical conductors 20A and 20B of second electrical bus 20 having a second, opposite electrical polarity, controller 40 causes switches of first bridge 28 and second bridge 34 to assume states whereupon positive conductor 8 receives positive electrical power from conductor 16A of first bus 16 and conductor 20B of second electrical bus 20, and negative conductor 10 receives electrical power from conductor 16B of first bus 16 and conductor 20A of second bus 20. Hence, circuits 12 will continue receiving a continuous supply of proper polarity electrical power even as vehicle 2 moves contacts 24A and 24B from being in contact with conductors 16A and 16B, through gap 22, and into contact with conductors 20A and 20B.

Figure 4A:
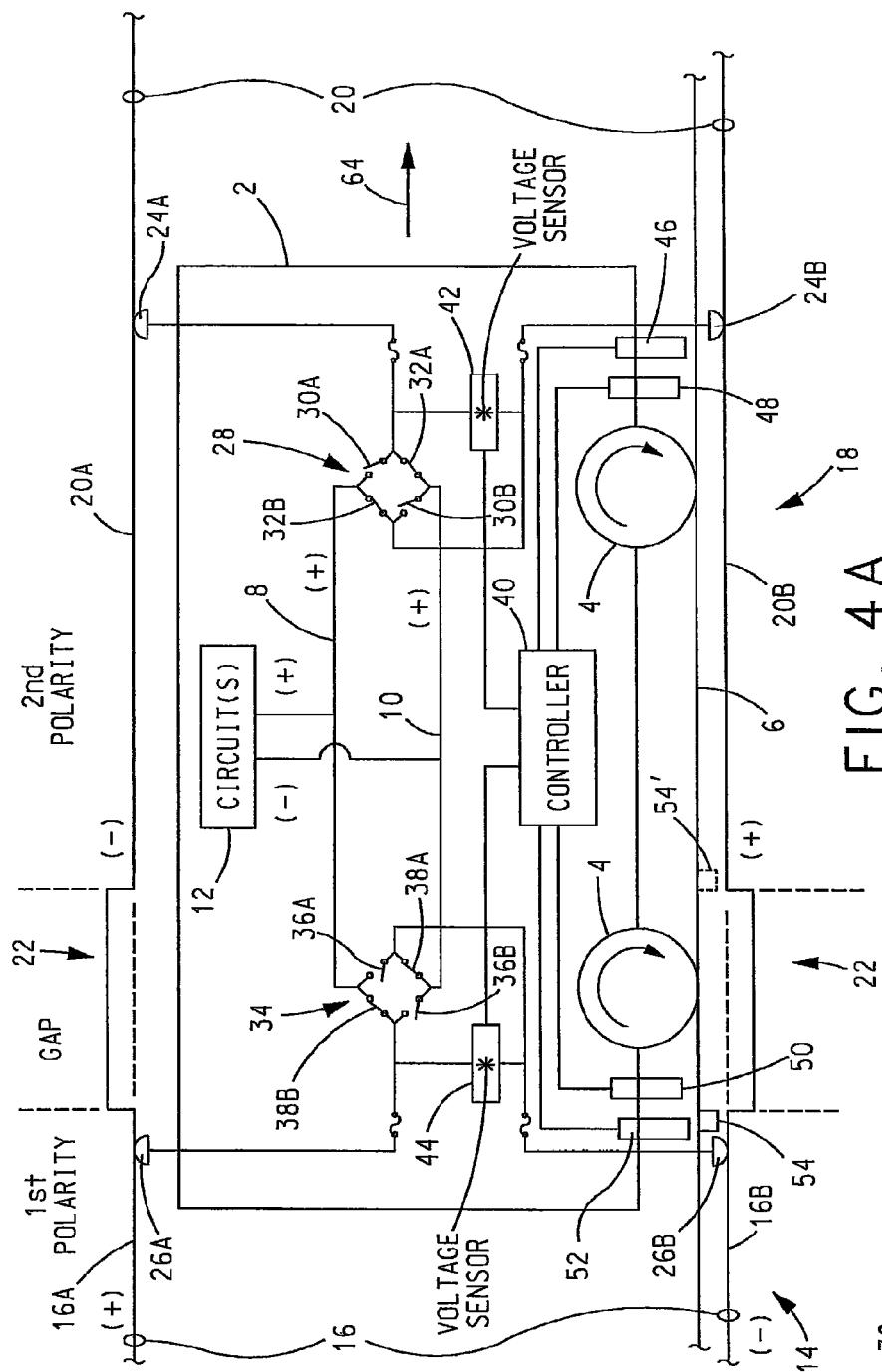
FIG. 4A is a schematic view of the vehicle shown in FIGS. 1A, 2A, and 3 after further movement from left to right wherein a second pair of flag sensors and the second pair of electrical contacts are about to move into the space or gap between the first electrical bus and the second electrical bus.
Figure 4B:
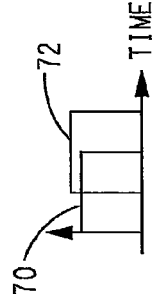
FIG. 4B is a drawing of signals output by the second pair of flag sensors positioned adjacent the second pair of contacts in FIG. 4A.

With reference to FIGS. 4A and 4B and with continuing reference to all previous figures, in response to vehicle 2 traveling in direction 64 to the position shown in FIG. 4A, flag sensor 50 passes wayside flag 54 and generates signal 70 (FIG. 4B), and flag sensor 52 passes wayside flag 54 and generates signal 72 (FIG. 4B).

Figure 5:
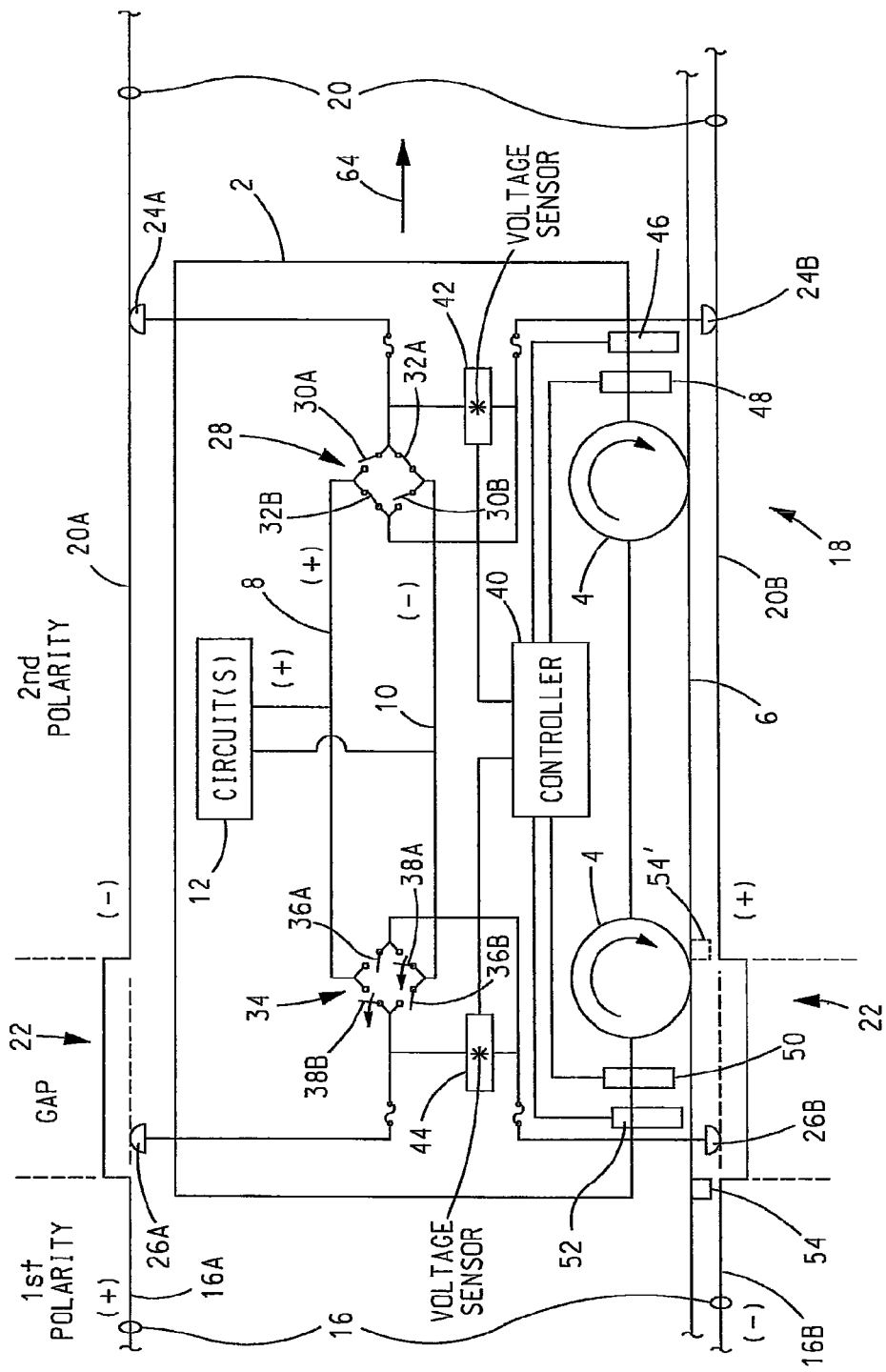
FIG. 5 is a schematic view of the vehicle shown in FIGS. 1A, 2A, 3, and 4A after further movement from left to right whereupon the second set of flag sensors and the second set of contacts are positioned in the space or gap between the first electrical bus and the second electrical bus.

With reference to FIG. 5 and with continuing reference to FIGS. 4A and 4B, in response to controller 40 detecting signals 70 and 72 in that order, which order is indicative of contacts 26A and 26B about to move into gap 22 from being in contact with first electrical bus 16, controller 40 implements a time delay of sufficient extent to allow contacts 26A and 26B to move into gap 22 from being in contact with contacts 16A and 16B of first electrical bus 16. Upon expiration of this time delay, whereupon vehicle 2 has traveled further in direction 64 to the position shown in FIG. 5 where contacts 26A and 26B are in gap 22, controller 40 controls the switches of second bridge 34 to either move from their closed states to open states or to remain in their open states. More specifically, when vehicle 2 moves from the position shown in FIG. 4A where contacts 26A and 26B are in contact with conductors 16A and 16B to the position shown in FIG. 5 where contacts 26A and 26B are in gap 22, controller 40 controls switches 38A and 38B to move from their closed states shown in FIG. 4A to their open states shown in FIG. 5, and controls switches 36A and 36B to remain in their open states.

Figure 6:
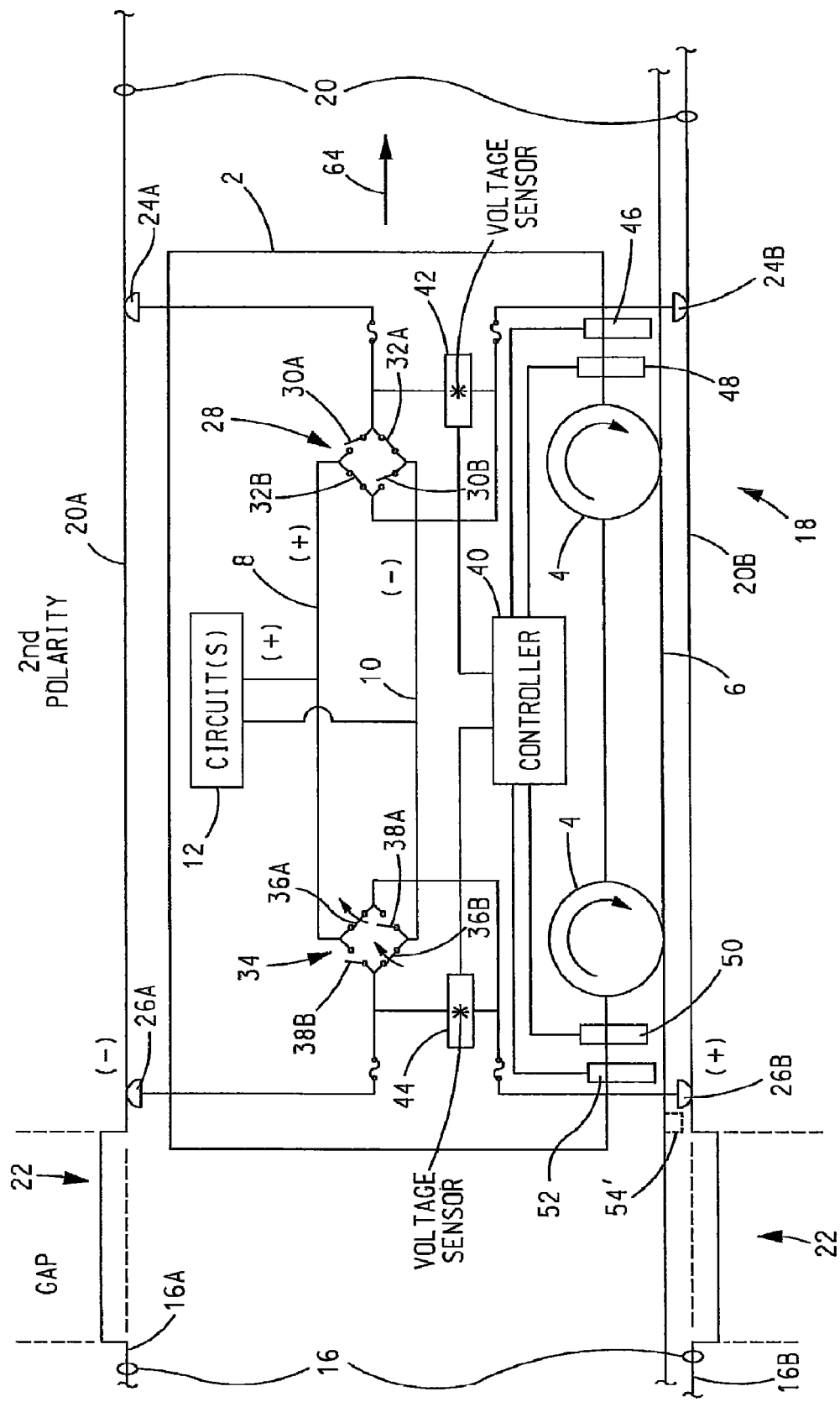
FIG. 6 is a view of the vehicle shown in FIGS. 1A, 2A, 3, 4A, and 5 after further movement from left to right whereupon the second set of contacts have moved into contact with the second electrical bus simultaneously with the first pair of contacts being in contact with the second electrical bus.

With reference to FIG. 6 and with continuing reference to all previous figures, in response to vehicle 2 moving in direction 64 from the position shown in FIG. 5A, where contacts 26A and 26B are in gap 22, to the position shown in FIG. 6, where contacts 26A and 26B move into contact with conductors 20A and 20B of second electrical bus 20, which act as a source of negative and positive electrical power, respectively, voltage sensor 44 senses the voltage impressed on contact 26A, contact 26B, or both contacts 26A and 26B by conductors 20A and 20B and provides an indication of the polarity of said sensed voltage(s) to controller 40. In response to receiving the indication of the polarity of conductors 20A and 20B in contact with contacts 26A and 26B, controller 40 controls the switches of second bridge 34 to move into or remain in state(s) where positive conductor 8 receives positive electrical power from conductor 20B and negative conductor 10 receives negative electrical power from conductor 20A. More specifically, controller 40 controls contacts 36A and 36B to move from their open states shown in FIG. 5 to their closed states shown in FIG. 6, while controlling contacts 38A and 38B to remain in their open states. When switches 36A and 36B of second bridge 34 are in their closed states, positive conductor 8 receives electrical power from conductor 20B of second electrical bus 20, acting as a positive source of electrical power via contact 26B, and negative conductor 10 receives electrical power from conductor 20A of second electrical bus 20, acting as a source of negative electrical power, via contact 26A. At the same time, positive conductor 8 and negative conductor 10 also receive positive and negative electrical power from conductors 20B and 20A of second electrical bus 20 via contacts 24B and 24A, respectively.

Thus, as can be seen, in response to vehicle 2 traveling in direction 64 from the position shown in FIG. 1A, where the first pair of contacts 24 and the second pair of contacts 26 are in contact with first electrical bus 16 having a first polarity, to the position shown in FIG. 2A where the first pair of contacts 24 are positioned in gap 22 while the second pair of contacts 26 are still in contact with the first electrical bus 16, controller 40 controls the switches of first bridge 28 to isolate the first pair of contacts 24 from positive conductor 8 and negative conductor 10. In response to vehicle 2 traveling to the position shown in FIG. 3, where the first pair of contacts are in contact with the second electrical bus 20 having a polarity opposite to the polarity of the first electrical bus 16, controller 40 controls the switches of first bridge 28 so that positive conductor 8 and negative conductor 10 receive positive and negative electrical power, respectively, from second electrical bus 20 at the same time positive conductor 8 and negative conductor 10 receive positive and negative electrical power, respectively, from first electrical bus 16 having a polarity opposite to the polarity of second electrical bus 20.

Furthermore, in response to vehicle 2 traveling in direction 64 to the position shown in FIG. 5 whereupon contacts 26A and 26B move into gap 22 while contacts 24A and 24B are in contact with second electrical bus 20, controller 40 controls the switches of second bridge 34 to isolate the second pair of contacts 26 from positive conductor 8 and negative conductor 10. Lastly, in response to vehicle 2 traveling in direction 64 to the position shown in FIG. 6 where contacts 26A and 26B are in contact with conductors 20A and 20B of second electrical bus 20, controller 40 controls the switches of second bridge 34 so that positive conductor 8 and negative conductor 10 receive positive and negative electrical power, respectively, from second electrical bus 20.

Referring back to FIG. 1, also or alternatively to the use of flag sensors 46-52 and wayside flag 54, one or more current sensors 56-62 can be positioned to detect current flowing through contacts 24A, 24B, 26A, and/or 26B, respectively, and to provide an indication of said current flow to controller 40 which can respond to the absence of current flowing through one or more of said contacts for controlling the operation of the switches of first bridge 28 and/or second bridge 34.

For example, in response to vehicle 2 traveling from the position shown in FIG. 1A to the position shown in FIG. 2A, current sensor(s) 56 and/or 58 will sense a decrease in the current flowing through contacts 24A and 24B due to these contacts moving into gap 22. In response to controller 40 detecting this decrease in current sensed by current sensor(s) 56 and/or 58, controller 40 causes switches 30A and 30B to move from their closed states shown in FIG. 1A to their open states shown in FIG. 2A.

Similarly, in response to vehicle 2 traveling from the position shown in FIG. 4A where contacts 26A and 26B are in contact with conductors 16A and 16B, to the position shown in FIG. 5 where contacts 26A and 26B are positioned in gap 22, controller 40 detects a decrease in current flowing through contacts 26A and 26B sensed by current sensors 60 and 62. In response to detecting this decrease in current, controller 40 causes switches 38A and 38B to move from their closed states shown in FIG. 4A to the open states shown in FIG. 5.

Thus, as can be seen, current sensors 56-62 can be utilized by controller 40 in the same manner as flag sensors 46-52 and wayside flag 54 to detect when each pair of contacts 24 and 26 move into gap 22. Current sensors 56-62 can be used also or alternatively with flag sensors 46-52 and wayside flag 54.

Figure 7:
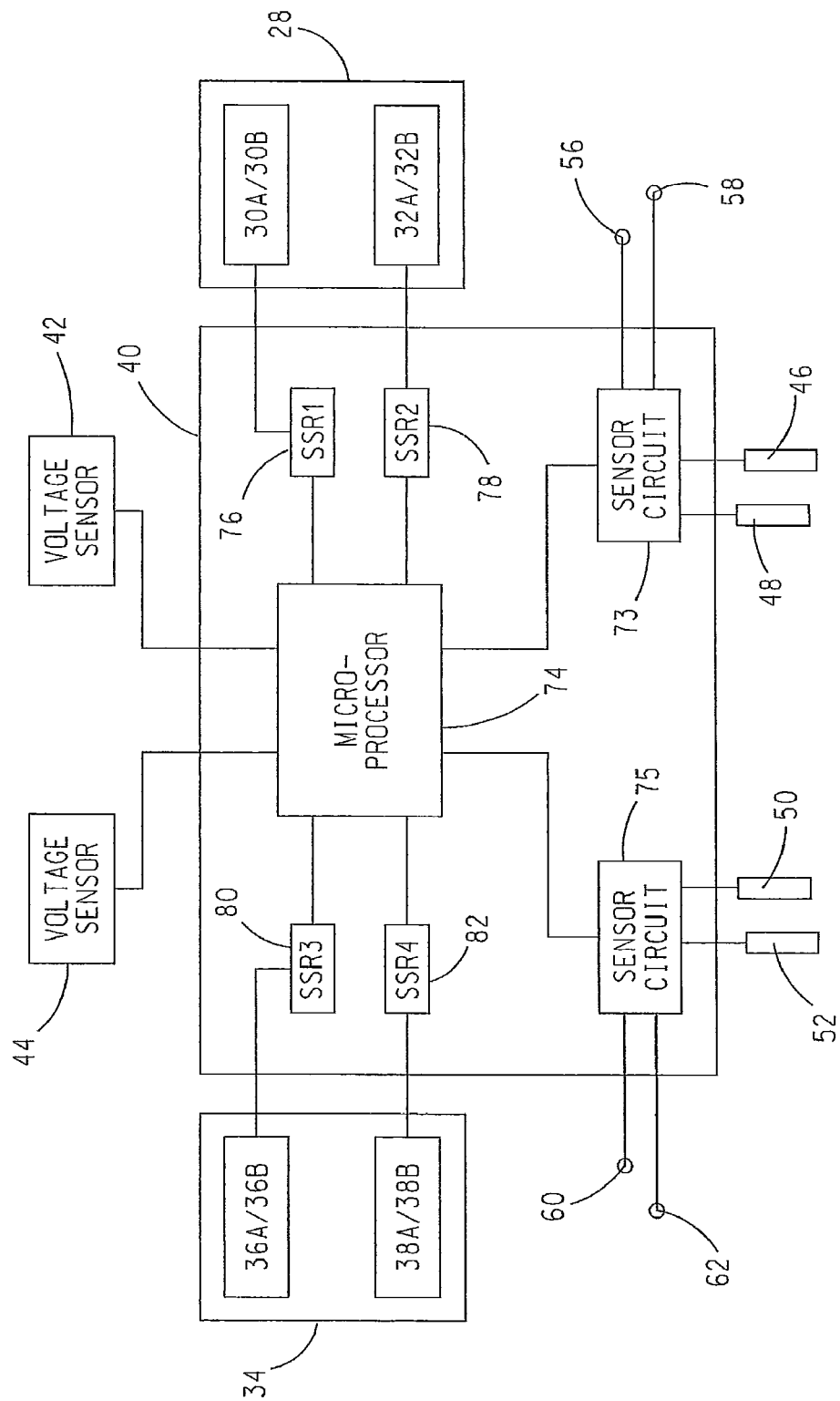
FIG. 7 is a first embodiment controller of the vehicle shown in FIGS. 1A, 2A, 3, 4A, 5, and 6.

With reference to FIG. 7, one embodiment of controller 40 can include a microprocessor 74 operating under the control of a control program. Microprocessor 74 includes buffer circuits, memory, and other like components known in the art which are not shown in FIG. 7 for the purpose of simplicity. Microprocessor 74 is connected to receive the output of voltage sensors 42 and 44. Microprocessor 74 is also connected to sensor circuit 73 which is operative for buffering and/or amplifying signals output by flag sensors 46 and 48 and/or current sensors 56 and 58 and for providing one or more appropriately buffered and/or amplified signals to microprocessor 74 for further processing. Similarly, microprocessor 74 is connected to a sensor circuit 75 which is operative for buffering and/or amplifying signals output by flag sensors 50 and 52 and/or current sensors 60 and 62 and one or more appropriately buffered and/or amplified signals to microprocessor 74 for further processing.

In response to signals received from sensor circuit 73 and/or sensor circuit 75, microprocessor 74 controls the operations of switches 30A-30B; 32A-32B; 36A-36B; and 38A-38B in the manner described above via solid state relays SSR1 76; SSR2 78; SSR3 80; and SSR4 82, respectively. Where each pair of switches 30A-30B; 32A-32B; 36A-36B; and 38A-38B are part of a double-pole double-throw switch or contactor assembly, microprocessor 74 can control each pair of switches to be in their open or closed states via the corresponding solid state relay. For example, if it is desired to have switches 30A-30B in their closed states, microprocessor 74 controls solid state relay SSR1 76 to supply an appropriate signal to a control input of the double-pole double-throw switch or contactor assembly comprising switches 30A-30B. Similar comments apply in respect of SSR2 78 controlling switches 32A-32B; SSR3 80 controlling the states of switches 36A-36B; and SSR4 82 controlling the states of switches 36A-36B, all under the control of microprocessor 74.

Figure 8:
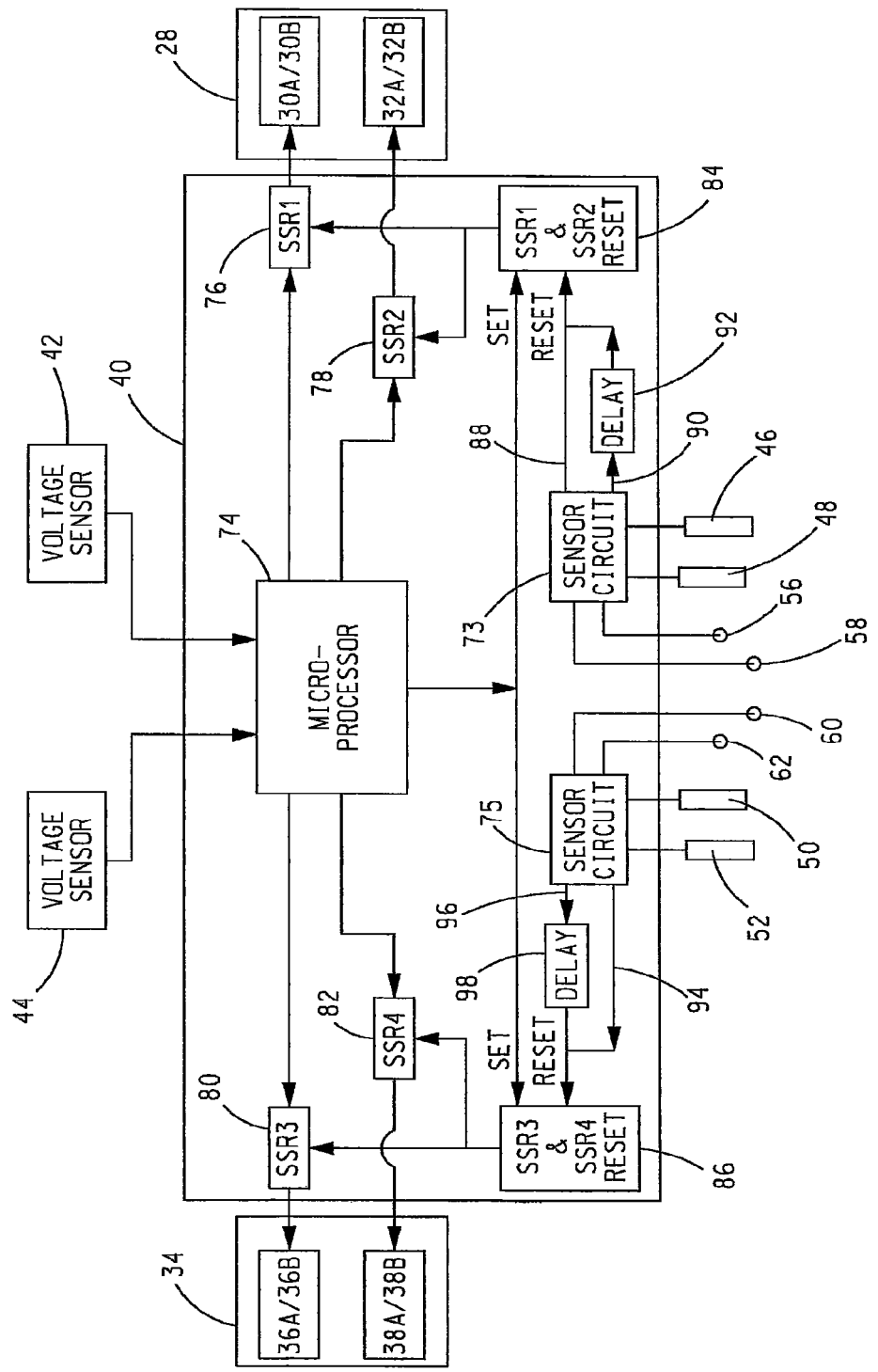
FIG. 8 is another embodiment controller of the vehicle shown in FIGS. 1A, 2A, 3, 4A, 5, and 6.

With reference to FIG. 8 and with continuing reference to FIG. 7, another embodiment of controller 40 can include a reset circuit 84 connected to inputs of SSR1 76 and SSR2 78 and a reset circuit 86 connected to inputs of SSR3 80 and SSR4 82. An output of microprocessor 74 is connected to the SET inputs of reset circuits 84 and 86. Each reset circuit 84 and 86 generally operates in the manner of a conventional SR Flip-Flop, which is well known in the art.

In this embodiment, each sensor circuit 73, 75 has two outputs. Sensor circuit 73 has a first output 88 connected to the RESET input of reset circuit 84. The second output 90 of sensor circuit 73 is coupled directly to an input of a delay circuit 92, the output of which is also connected to the RESET input of reset circuit 84. In a similar manner, sensor circuit 75 has a first output 94 coupled directly to the RESET input of reset circuit 86. A second output 96 of sensor circuit 75 is coupled to an input of a delay circuit 98, the output of which is also connected to the RESET input of reset circuit 86.

In operation of the embodiment of controller 40 shown in FIG. 8, microprocessor 74 outputs a set signal to SET inputs of reset circuits 84 and 86. Microprocessor 74 also outputs control signals to SSR1 76, SSR2 78, SSR3 80, and SSR4 82 to set the switches of first bridge 28 and second bridge 34 to desired states. Thereafter, in response to vehicle 2 traveling in direction 64, whereupon flag sensors 46 and 48 pass wayside flag 54 thereby producing signals 66 and 68, respectively, sensor circuit 73 outputs a reset signal on first output 88 that causes reset circuit 84 to output a reset signal to SSR1 76 and SSR2 78. In response to this reset signal, each switch 30A, 30B, 32A, and 32B either switches from its closed state to its open state or remains in its open state. The passage of this reset signal to first bridge 28 is controlled by microprocessor 74 applying suitable control signals to inputs of SSR1 76 and SSR2 78.

When vehicle 2 is traveling in direction 64, delay circuit 92 is not used. However, the operation of delay circuit 92 is similar to the operation of delay circuit 98 (to be discussed next) when vehicle 2 is moving in a direction opposite direction 64.

Next, in response to flag sensors 50 and 52 passing wayside flag 54 and generating signals 70 and 72, respectively, sensor circuit 75 outputs a signal on second output 96 to the input of delay circuit 98. In response to the input of delay circuit 98 receiving the signal from the second output 96 of sensor circuit 75, delay circuit 98 implements the time delay (discussed above) before outputting a reset signal to the RESET input of reset circuit 86, which reset signal causes reset circuit 86 to output a reset signal to SSR3 80 and SSR4 82. In response to this reset signal, each switch 36A, 36B, 38A, and 38B either switches from its closed state to an open state or remains in its open state under the control of microprocessor 74 applying suitable control signals to inputs of SSR3 80 and SSR4 82. This time delay provides time for contacts 26A and 26B to move from the position shown in FIG. 4A in contact with conductors 16A and 16B into the gap 22, as shown in FIG. 5, before any of the switches of second bridge 34 open. This time delay prevents switching of any switch of second bridge 34 from its closed state to its open state during a time electrical power is being supplied via said switch to positive conductor 8 or negative conductor 10 from first electrical bus 16.

In a manner similar to the operation of delay circuit 98, delay circuit 92 implements a time delay that delays any switch of first bridge 28 from moving from its closed state to an open state when vehicle 2 is moving in a direction opposite direction 64 and contacts 24A and 24B transition from being in contact with, for example, conductors 20A and 20B of second electrical bus 20 (FIG. 6) into gap 22 (FIG. 5).

Referring back to FIGS. 1A, 2A, 3, 4A, 5, and 6, another wayside flag 54' (shown in phantom) can be provided at a location on path 6 to the right of gap 22. This wayside flag 54' in combination with flag sensors 46-52 can be utilized in the manner described above when vehicle 2 is moving in a direction opposite direction 64 to detect when contacts 26A and 26B have transitioned from being in contact with conductors 20A and 20B of second electrical bus 20 into gap 22, and to detect when flag sensors 46 and 48 have passed wayside flag 54' and to implement a time delay, e.g., via delay circuit 92, to delay the opening of one or more switches of first bridge 28 until contacts 24A and 24B have moved from being in contact with conductors 20A and 20B of second electrical bus 20 into gap 22.

Referring back to FIG. 8, also or alternatively to the use of flag sensors 46-52 and one or both wayside flags 54, 54', one or more current sensors 56-62 can be coupled to sensor circuits 73 and 75 in FIG. 8 and can be utilized in the manner described above to sense when one or more of contacts 24A, 24B, 26A, and/or 26B are either receiving electrical current, indicative of the corresponding contact being in contact with an electrical bus, or not receiving current, indicative of the corresponding contact being positioned in gap 22.

The present invention has been described with reference to preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. In a vehicle having positive and negative conductors for supplying electrical power to one or more electrical circuits of the vehicle as the vehicle moves along a path from a first section of the path that has a first electrical bus of a first electrical polarity to a second section of the path that has a second electrical bus of a second, opposite electrical polarity, wherein the first and second electrical buses are spaced from each other, a method of supplying electrical power of proper polarity to the positive and negative conductors of the vehicle comprising:

(a) electrically connecting first and second pairs of vehicle mounted contacts between the first electrical bus and the positive and negative conductors of the vehicle, each pair of contacts including first and second contacts electrically connected between positive and negative conductors of the first electrical bus and the positive and negative conductors of the vehicle, respectively;

(b) following step (a), in response to the vehicle moving the first pair of contacts into the space between the first and second electrical buses while the second pair of contacts are electrically connected between the first electrical bus and the positive and negative conductors of the vehicle, electrically isolating the first pair of contacts from the positive and negative conductors of the vehicle; and (c) following step (b), in response to the vehicle moving the first pair of contacts into contact with the second electrical bus while the second pair of contacts are electrically connected between the first electrical bus and the positive and negative conductors of the vehicle, electrically connecting the first and second contacts of the first pair of contacts between the negative and positive conductors of the vehicle and negative and positive conductors of the second electrical bus, respectively.

2. The method of claim 1, further including:

(d) following step (c), in response to the vehicle moving the second pair of contacts into the space between the first and second electrical buses while the first pair of contacts are electrically connected between the second electrical bus and the positive and negative conductors of the vehicle, electrically isolating the second pair of contacts from the positive and negative conductors of the vehicle; and (e) following step (d), in response to the vehicle moving the second pair of contacts into contact with the second electrical bus while the first pair of contacts are electrically connected between the second electrical bus and the positive and negative conductors of the vehicle, electrically connecting the first and second contacts of the second pair of contacts between the negative and positive conductors of the vehicle and negative and positive conductors of the second electrical bus, respectively.

3. The method of claim 2, further including, for each pair of contacts, automatically connecting the first and second contacts of said pair of contacts to either the positive and negative conductors of the vehicle or the negative and positive conductors of the vehicle based on a polarity of a voltage between said pair of contacts in contact with the first or second electrical bus.

4. The method of claim 2, further including, for each pair of contacts, automatically isolating said pair of contacts in the space between the first and second electrical buses from the positive and negative conductors of the vehicle based on an absence of current flowing through at least one of said contacts.

5. The method of claim 1, wherein step (b) includes electrically isolating the first pair of contacts from the positive and negative conductors of the vehicle in response to determining that the first pair of contacts have moved from electrical contact with the first electrical bus into the space between the first and second electrical buses.

6. The method of claim 5, wherein determining that the first pair of contacts have moved from electrical contact with the first electrical bus into the space between the first and second electrical buses is based on movement of the vehicle relative to the space between the first and second electrical buses.

7. The method of claim 2, wherein step (d) includes determining when the second pair of contacts is about to move from electrical contact with the first electrical bus into the space between the first and second electrical buses, and delaying electrically isolating the second pair of contacts from the positive and negative conductors of the vehicle until the vehicle has moved the second pair of contacts into the space between the first and second electrical buses.

8. The method of claim 5, wherein determining when the second pair of contacts is about to move from electrical contact with the first electrical bus into the space between the first and second electrical buses is based on movement of the vehicle relative to the space between the first and second electrical buses.

9. In a vehicle having positive and negative conductors for supplying electrical power to one or more electrical circuits of the vehicle, a system for supplying desired polarity electrical power to the positive and negative conductors of the vehicle as the vehicle moves along a path from a first section of the path that has a first electrical bus of a first electrical polarity to a second section of the path that has a second electrical bus of a second, opposite electrical polarity, wherein the first and second electrical buses are spaced from each other, the system comprising:
- a first polarity switching bridge having input nodes coupled to a first pair of contacts and output nodes connected to the positive and negative conductors of the vehicle;
- a second polarity switching bridge having input nodes coupled to a second pair of contacts and output nodes connected to the positive and negative conductors of the vehicle, wherein each polarity switching bridge includes a plurality of switches or contactors connected in a bridge configuration;
- means for detecting when each pair of contacts are in the space between the first and second electrical buses or moving into the space between the first and second electrical buses; and
- a controller responsive to the means for detecting for controlling the switches or contactors of each polarity switching bridge in coordination with the movement of the vehicle along the path such that, for each pair of contacts, the switches or contactors of the corresponding polarity switching bridge are set to first, second, and third states when said pair of contacts are in contact with the first electrical bus, in the space between the first and second buses, and in contact with the second electrical bus, respectively, wherein:
- the first, second, and third states of the switches or contactors are different;
- the first and third states of the switches or contactors couple the positive and negative conductors of the vehicle to positive and negative conductors of the first and second electrical buses that have opposite polarities via said pair of contacts; and
- the second state of the switches or contactors isolate the positive and negative conductors of the vehicle from said pair of contacts.

10. The system of claim 9, wherein the first pair of contacts and the second pair of contacts are spaced from each other on the vehicle a distance that is greater than the space between the first and second electrical buses, whereupon the first pair of contacts can be in contact with the second electrical bus while the second pair of contacts are in contact with the first electrical bus.

11. The system of claim 9, wherein the means for detecting include at least one of the following:
- a current sensor for detecting a flow of current through at least one contact; and
- a flag sensor for detecting the presence of a flag on the path.

12. In a vehicle having positive and negative conductors for supplying electrical power to one or more electrical circuits of the vehicle as the vehicle moves along a path from a first section of the path that has a first electrical bus of a first electrical polarity to a second section of the path that has a second electrical bus of a second, opposite electrical polarity, wherein the first and second electrical buses are separated from each other by a space, a method of supplying electrical power of proper polarity to the positive and negative conductors of the vehicle comprising:
- (a) coupling the positive and negative conductors of the vehicle to positive and negative conductors of the first electrical bus having the first polarity via first and second pairs of contacts;
- (b) following step (a), in response to the first pair of contacts moving into the space between the first and second electrical buses when the positive and negative conductors of the vehicle are coupled to the positive and negative conductors of the first electrical bus via the second pair of contacts, isolating the first pair of contacts from the positive and negative conductors of the vehicle; and
- (c) following step (b), in response to the first pair of contacts moving into contact with positive and negative conductors of the second electrical bus having the second polarity opposite the first polarity while the positive and negative conductors of the vehicle remain coupled to the positive and negative conductors of the first bus via the second pair of contacts, coupling the positive and negative conductors of the vehicle to the positive and negative conductors of the second electrical bus via the first pair of contacts.

13. The method of claim 12, further including:
- (d) following step (c), in response to the second pair of contacts moving into the space between the first and second electrical buses when the positive and negative conductors of the vehicle are coupled to the positive and negative conductors of the second electrical bus via the first pair of contacts, isolating the second pair of contacts from the positive and negative conductors of the vehicle; and
- (e) following step (d), in response to the second pair of contacts moving into contact with the positive and negative conductors of the second electrical bus when the positive and negative conductors of the vehicle are coupled to the positive and negative conductors of the second bus via the first pair of contacts, coupling the positive and negative conductors of the vehicle to the positive and negative conductors of the second electrical bus via the second pair of contacts.

14. The method of claim 13, further including determining the connection of each pair of contacts to the positive and negative conductors of the vehicle based on the polarity of the electrical bus in contact with said pair of contacts.

15. The method of claim 13, further including, for each pair of contacts, isolating said pair of contacts in the space between the first and second electrical buses from the positive and negative conductors of the vehicle based on an absence of current flowing through at least one of said contacts.

16. The method of claim 12, wherein step (b) includes isolating the first pair of contacts from the positive and negative conductors of the vehicle in response to determining that the first pair of contacts have moved from electrical contact with the first electrical bus into the space between the first and second electrical buses.

17. The method of claim 16, wherein determining that the first pair of contacts have moved from electrical contact with the first electrical bus into the space between the first and second electrical buses is based on detection of a flag positioned along the path by the space between the first and second electrical buses.

18. The method of claim 13, wherein step (d) includes determining when the second pair of contacts is about to move from electrical contact with the first electrical bus into the space between the first and second electrical buses, and delaying electrically isolating the second pair of contacts from the positive and negative conductors of the vehicle until the vehicle has moved the second pair of contacts into the space between the first and second electrical buses.

19. The method of claim 16, wherein determining when the second pair of contacts is about to move from electrical contact with the first electrical bus into the space between the first and second electrical buses is based on detection of a flag positioned along the path by the space between the first and second electrical buses.

20. The method of claim 1, wherein the space between the first and second electrical buses is either (1) a physical opening or (2) an insulated or non-electrically conductive section of track.

21. The system of claim 9, wherein the space between the first and second electrical buses is either (1) a physical opening or (2) an insulated or non-electrically conductive section of track.

22. The method of claim 12, wherein the space between the first and second electrical buses is either (1) a physical opening or (2) an insulated or non-electrically conductive section of track.

* * * * *